United States Patent [19]
Eckerrot et al.

[11] Patent Number: 4,658,169
[45] Date of Patent: Apr. 14, 1987

[54] SYNCHRONOUS MACHINE WITH COIL HALVES

[75] Inventors: Hans Eckerrot, Oskarshamn; Knut Eriksson; Bengt Rothman, both of Västerås, all of Sweden

[73] Assignee: ASEA Aktiebolag, Västerås, Sweden

[21] Appl. No.: 670,458

[22] Filed: Nov. 13, 1984

Related U.S. Application Data

[63] Continuation-in-part of Ser. No. 399,082, Jul. 16, 1982.

[30] Foreign Application Priority Data

Sep. 7, 1981 [SE] Sweden .............................. 8105291

[51] Int. Cl.$^4$ .............................................. H02K 3/04
[52] U.S. Cl. ..................................... 310/208; 310/213
[58] Field of Search ............... 310/260, 194, 198–208, 310/213, 254, 179, 180, 181, 184, 71, 157, 162, 163, 269

[56] References Cited

U.S. PATENT DOCUMENTS

| | | | |
|---|---|---|---|
| 1,401,996 | 1/1922 | Lundell | 310/180 |
| 2,085,099 | 6/1937 | Jones | 310/208 |
| 2,561,428 | 7/1951 | Sutherland | 310/180 |
| 3,185,872 | 5/1965 | Weissheimer | 310/213 |
| 3,344,297 | 9/1967 | Bishop | 310/260 |
| 3,631,278 | 12/1971 | Snively | 310/179 |
| 4,308,476 | 12/1981 | Schuler | 310/213 |
| 4,309,634 | 1/1982 | Koroly | 310/184 |

FOREIGN PATENT DOCUMENTS

| | | | |
|---|---|---|---|
| 0612862 | 5/1935 | Fed. Rep. of Germany | 310/208 |
| 0705386 | 4/1941 | Fed. Rep. of Germany | 310/208 |
| 0932972 | 9/1955 | Fed. Rep. of Germany | 310/208 |
| 0088843 | 6/1982 | Japan | 310/259 |

OTHER PUBLICATIONS

Herstellung der Wicklungen electrisher Machinen; H. Sequenz; p. 123; 1973.

Primary Examiner—R. Skudy
Attorney, Agent, or Firm—Pollock, Vande Sande & Priddy

[57] ABSTRACT

The stator winding of a synchronous machine is made as a lap winding or as a wave winding and comprises a plurality of coils, each of which being composed of a top coil half (107) and a bottom coil half (105), the two coil halves, which are series-connected, to each other by means of a connecting device (106), being of identical shape.

4 Claims, 10 Drawing Figures

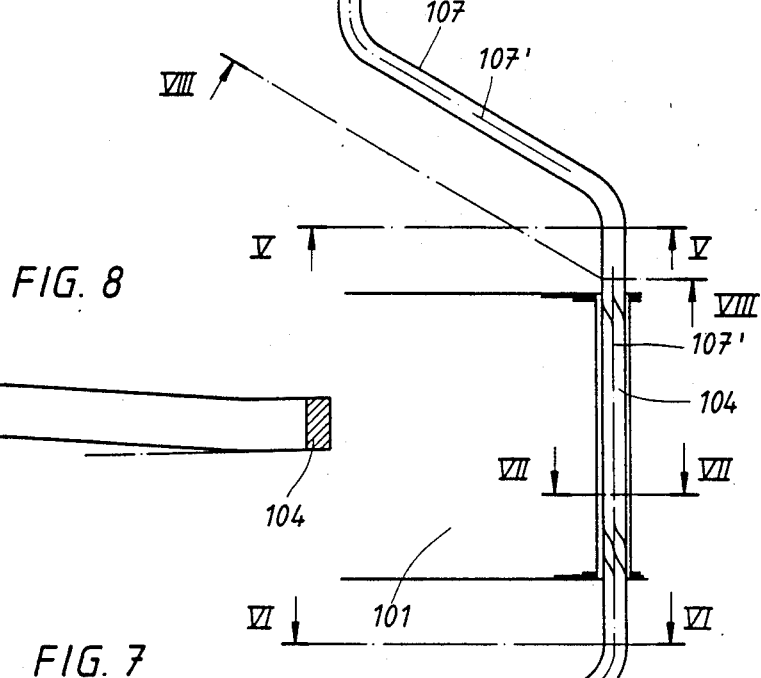
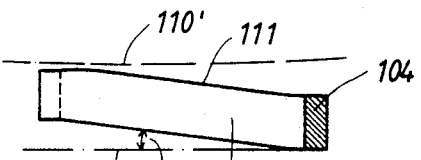
FIG. 5
FIG. 4
FIG. 8
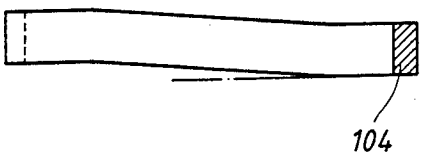
FIG. 7
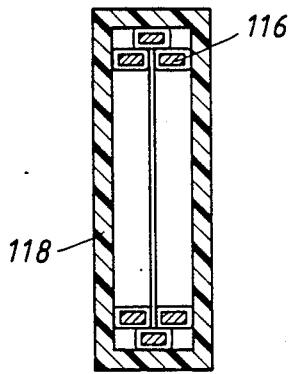
FIG. 6

SYNCHRONOUS MACHINE WITH COIL HALVES

This is a continuation-in-part application of Ser. No. 399,082, filed July 16, 1982.

TECHNICAL FIELD

The present invention relates to a high voltage synchronous machine comprising a rotor having at least ten salient poles; an annular stator core including a plurality of axially extending inwardly directed winding slots; a winding disposed in said slots comprising a plurality of winding coils, each comprising a connecting device, a bottom coil half and a top coil half, each half having a rectangular cross-section and a plurality of strands insulated from each other, each of said coil halves having a corresponding center line running along its entire length; said bottom coil half having a straight bottom portion located at the bottom of a corresponding winding slot; said top coil half having a straight top portion located at the top of a different winding slot; said straight portions being connected in series with each other at a stator end through a top coil end half serially connected through said connecting device with a bottom coil end half; the tangential extension of said connecting device constituting a smaller part, only, of the tangential extension of said coil.

BACKGROUND ART

On page 123, FIG. 60, in the book *Herstellung der Wicklungen elektrischer Maschinen* by H. Sequenz (Springer-Verlag/Wien 1973), there is shown an undivided stator coil which is arranged in two radially inwardly-facing slots provided in an annular stator core intended for a rotating AC machine, which stator coil differs from the coil type mentioned in the introduction by the fact that the two coil halves constitute integral parts of a unitarily manufactured coil and are thus not connected together with the aid of a special connection piece.

In conventional coils formed from two interconnected coil halves, for example the coil shown in U.S. Pat. No. 3,344,297 and the coil shown in German Pat. No. 932.972, the two coil halves are made with substantially the same shape as the coil halves of the above-mentioned coil shown in the book, whereas the outermost part of the coil end is replaced by the above-mentioned special connection piece. Each of the two series-connected coil end halves—which together constitute a coil end—is constructed in such a way that the radial distance to the air gap has its smallest value near the winding slot and then increases with increasing axial distance from the end surface of the annular stator core, whereby the maximum increase of the radial distance is greater with the bottom coil end half than with the top coil end half. The radially outwardly-directed surfaces of all the top coil end halves and the radially inwardly-directed surfaces of the bottom coil end halves are then positioned in a radially inner and a radially outer imaginary, conical surface, respectively. In the same manner as with corresponding stator windings comprising unitarily manufactured coils only, these surfaces are formed with a space between them in order to achieve sufficient ventilation and sufficient safety against flashover.

When unitarily manufactured coils are used, the top coil end halves—which constitute integral parts of the coils—are formed in such a way that they are lying in an conical surface which is tapering in a direction towards the stator core, which is advantageous since a tapering of this kind often reduces the risk of damaging the stator winding during the insertion of a rotor into the stator.

Also the machines disclosed in the patent specifications mentioned above are made with their top coil end halves lying in a conical surface which is tapering towards the stator core.

DISCLOSURE OF THE INVENTION

The invention is based on the realization that—with machines of the kind initially stated—substantial advantages can be obtained by departing from the principle of using top coil end halves lying in a conical surface which is tapering towards the stator core and, instead, using top coil end halves which are touching an conical surface tapering in the axial direction away from the stator core. With a machine made in accordance with the last-mentioned design principle, insertion of the rotor into the stator will certainly require greater precision, but this inconvenience is small compared with the advantages available when this principle is accepted.

As a structural consequence of the last-mentioned principle, a top coil end half and a bottom coil end half of a coil end are disposed radially inside and radially outside, respectively, in relation to an circular cylindrical surface, which is coaxial with the stator core. Both of these coil ends are converging with said cylindrical surface in a direction towards the stator core. At all axial distances from the stator core, they have mutually equal radial distances to the cylindrical surface. With a machine according to the invention, the stator winding comprises a plurality of stator coils of identical shape, each stator coil comprising two coil halves which are of identical shape when mounted in the stator—or at least they are of identical shape at the initial stage of their mounting. The reservation is made for the case that a slight twisting of a coil half end would take place during its insertion into the connecting device mentioned above. In any event, the center lines of the two coil halves are mutually congruent. In the present text, the term congruent is used in its geometrical sense, of course, and the statement above is quite equivalent to a statement according to which "the center lines of the two coil halves of a coil are of identical shape". By the term "the center line of a coil half" is meant a line running inside the coil half only, thereby running through the mid-points of all conceivable cross-sections of the coil half.

With a machine according to the invention, the shape of the center line of said top coil half is identical with the shape of the center line of said bottom coil half, and said top coil end half has a radially inwardly directed surface, the radial distance between said radially inwardly directed surface and an axial extension of the air gap surface of the stator varying along said top coil end half, whereby said radial distance along a part—preferably a major part—of said top coil end half is smaller than the average radial distance between said air gap surface and the radially inwardly facing surface of said straight top portion. As a consequence of these features, the top coil end half is—with a major part of its radially outwardly-facing surface—located radially inside a first imaginary plane, which touches the radially outwardly-facing surface of said straight top portion and is positioned perpendicularly to an axial plane through the mid-point of said straight top portion, while said top coil end half with a major part of its radially outwardly-facing surface is located in a second imaginary plane which intersects said first plane along a substantially axially extending intersectional line and at a first acute angle, whereas said bottom coil end half with a major part of its radially inwardly-facing surface is located radially outside a third plane, which touches the radially inwardly-facing surface of said straight bottom portion and is positioned perpendicular to an axial plane through the mid-portion of said straight bottom portion, while said bottom coil end half with a major part of its radially inwardly-facing surface is located in a fourth plane which intersects said third plane along a substantially axially extending intersectional line and at a second acute angle, the axial projection of said first angle being equal to the axial projection of said second angle.

Due to the fact that all coil halves of a machine according to the invention are made with identical shape, the number of production lines necessary for making the coil halves of a machine can be reduced from two to one. Further, the costs connected with keeping spare coil halves in stock are reduced by 50%.

With conventional machines, the risk of confusing top coil halves and bottom coil halves with each other always exists. Mistakes of that kind may be very expensive, for example in cases when a synchronous machine is out of operation due to a breakdown of the stator winding, and spare coil halves have to be delivered from the manufacturer as soon as possible. Such mistakes cannot occur with a machine according to the invention.

BRIEF DESCRIPTION OF THE DRAWINGS

In the accompanying drawings,

FIG. 2 shows a partial axial section of a synchronous machine according to the invention, whereas

FIGS. 5 and 6 show the same coil half in section and view along V—V and VI—VI, respectively, of FIG. 4, whereas FIG. 7 shows a section along VII—VII of FIG. 4.

FIG. 8 shows an alternative structure of a coil half according to the invention and is a section through VIII—VIII in FIG. 4.

DESCRIPTION OF PREFERRED EMBODIMENTS

Figure 1:
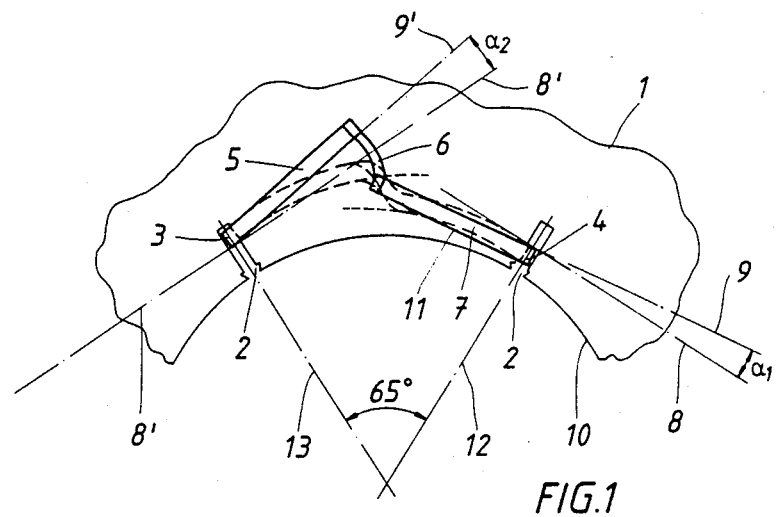
FIG. 1 shows a partial axial view of a synchronous machine stator in which two coil halves of the type used in a synchronous machine according to the invention are arranged to replace the above-mentioned coil described by H Sequenz. The latter coil is drawn in dashed lines.
Figure 2:
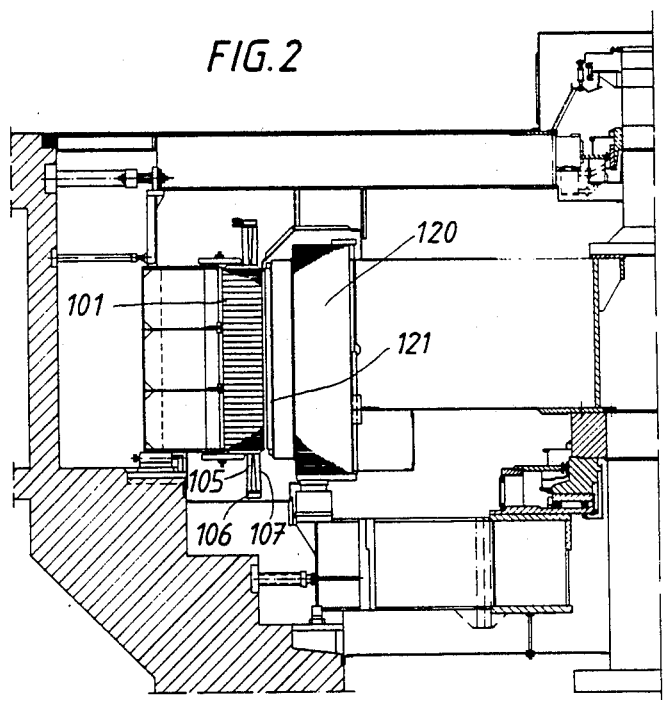

In FIG. 1, the numeral 1 designates a stator core of a synchronous machine. The stator core 1 has a radially inwardly-directed air gap surface 10 and is provided with a plurality of axial, evenly distributed and radially inwardly-directed winding slots 2, of which only two are shown on the drawing. The two slots 2 together support a winding coil, which comprises a straight bottom portion 3 located at the bottom of one winding slot, and a straight top portion 4 located near the opening of the second slot. Outside one of the end surfaces of the stator core 1, the straight bottom portion 3 is electrically connected to the straight top portion 4 by means of a coil end, which includes a bottom coil end half 5 extending from the straight bottom portion 3 and a top coil end half 7 extending from the straight top portion. The two coil end halves 5 and 7 are electrically connected to each other by means of a connecting device 6. Each coil half is composed of a plurality of transposed strands, provided with strand insulation and running along the whole coil half, and comprises, besides the shown coil end half, a similar coil end located axially outside the end of the stator core which is not shown, the latter coil end extending peripherally in one or the other direction depending on whether the winding is made as a wave winding or as a lap winding.

The top coil end half 7 is located in its entirety radially inside an imaginary plane 8 and with a predominant part of its radially outwardly-facing surface in an imaginary plane 9. The plane 8 is perpendicular to an axial plane through the middle of the winding slot in which the straight top portion 4 is arranged. The two planes 8 and 9 intersect each other along a substantially axially directed line of intersection and with an angle of intersection, $\alpha_1$, of approximately 7°. The radial distance between the air gap surface 10 and the radially inwardly-facing surface of the top coil end half 7 is, along a minor part of the latter, smaller than the average radial distance between the straight top portion 4 and the air gap surface 10. The straight portions 3 and 4 which, similarly to the other parts of the coil halves, are formed with rectangular cross-section, are positioned with their side surfaces parallel to the slot walls. The coil half in which the portions 3 and end half 5 are included has—disregarding differences in shape lying within ordinary manufacturing tolerances—a shape which is identical with the shape of the coil half in which the portions 4 and end half 7 are included. When 9' designates a plane which coincides with practically all of the radially inwardly-facing surface of the coil end half 5, this means that the angle $\alpha_2$ between planes 8' and 9' is equal to the angle $\alpha_1$ between planes 8 and 9, provided the plane 8' is perpendicular to an axial plane through the middle of the straight bottom portion 3, and planes 9' and 8' are intersecting each other along a substantially axially directed intersectional line. Since all coil end halves are of identical shape, the line of intersection between the planes 8' and 9' deviates from a purely axial direction with the same angle as the line of intersection between the planes 8 and 9, but the signs are different.

In the stator shown in FIG. 1, the coil extends over an arc of about 65°. A winding coil according to the invention is more advantageous when this arc is considerably smaller, and therefore a synchronous machine according to the invention is preferably made with at least ten poles. The machine shown in FIGS. 2–8 has a rotor 120 which is made with forty salient poles 121.

In FIGS. 2–8 the reference numerals 101–111 designate the same items as the reference numerals 1–11 in FIG. 1.

In the shown machine, each top coil half consists of a bundle of transposed strands 116 insulated from each other. The bundle of transposed strands 116 insulated from each other. The bundle is surrounded by coil insulation 118. The strand bundle forms a straight top portion 104 as well as two top coil end halves 107 and 114, respectively, which are each arranged at corresponding stator ends. Each of said top coil end halves is positioned with a predominant part of its radially outwardly-facing surface in a corresponding plane 109, which makes an angle $\alpha_1$ with a plane 108 which is perpendicular to an axial plane, 112, running through the middle of the straight top portion 104, and which intersects this plane along an axially directed intersecting line. Alternatively, the coil half can be constructed in such a way that each top coil end half lies with a predominant part of its radially outwardly-facing surface in a plane, whose intersecting line with the plane 108 is not purely axially directed, but which substantially extends in the axial direction, for example as shown in FIG. 8, where the intersecting line in question extends perpendicularly in relation to the inclined part of the section VIII—VIII. For this alternative, the angle $\alpha_1$ shown in FIG. 3 and FIG. 5 can be considered as an axial projection of the real angle between the plane 108 and an plane in which a major part of the radially outwardly-facing surface of the coil end half 107 is lying. In the same way the angle $\alpha_2$ can be considered as an axial projection of the real angle between the plane 108' and an plane in which a major part of the radially inwardly-facing surface of the coil end half 105 is lying. Since the two coil halves of a coil are of identical shape, it is evident that the intersectional line between the plane 108' and an plane in which a major part of the radially inwardly-facing surface of the coil end half 105' is lying will deviate from the axial direction in the same way as the intersectional line between the planes 108 and 109. This means that the deviations of the two intersectional lines from an axial direction are equal as regards the nominal value, but of different signs. One deviation is positive, the other is negative.

Figure 3:
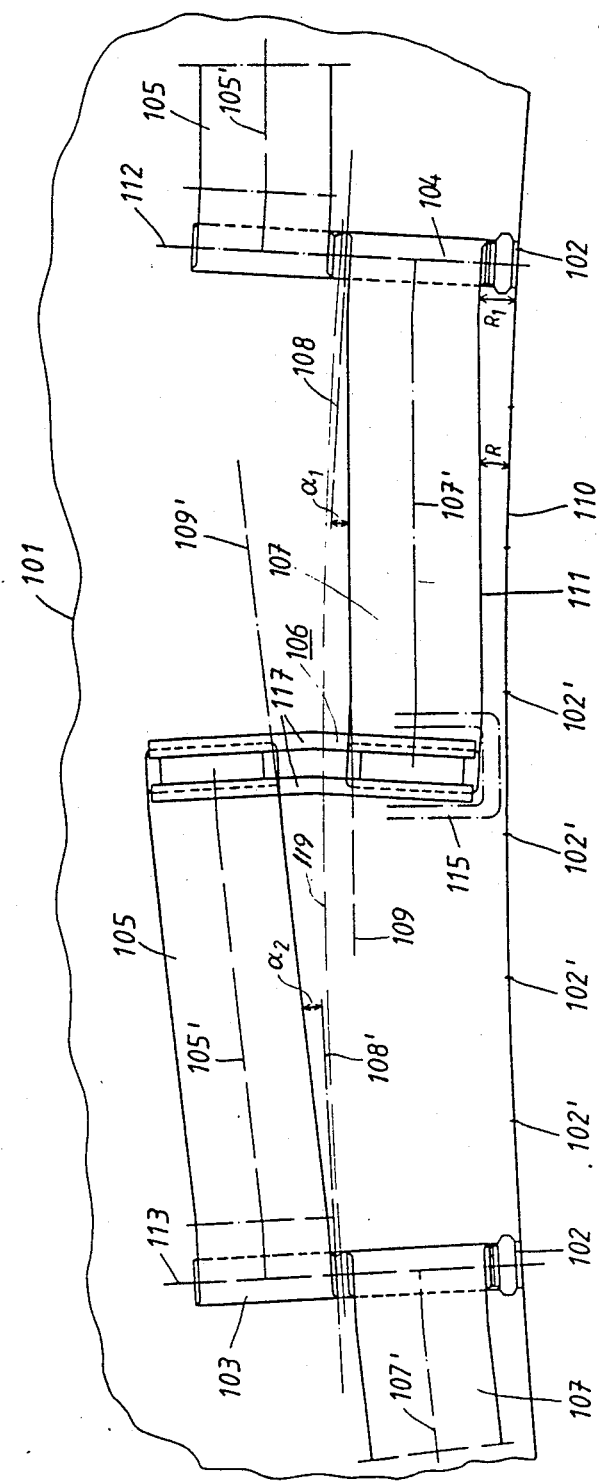
FIG. 3 shows a detail of the stator in the same synchronous machine in an axial view from above.
Figure 3A:
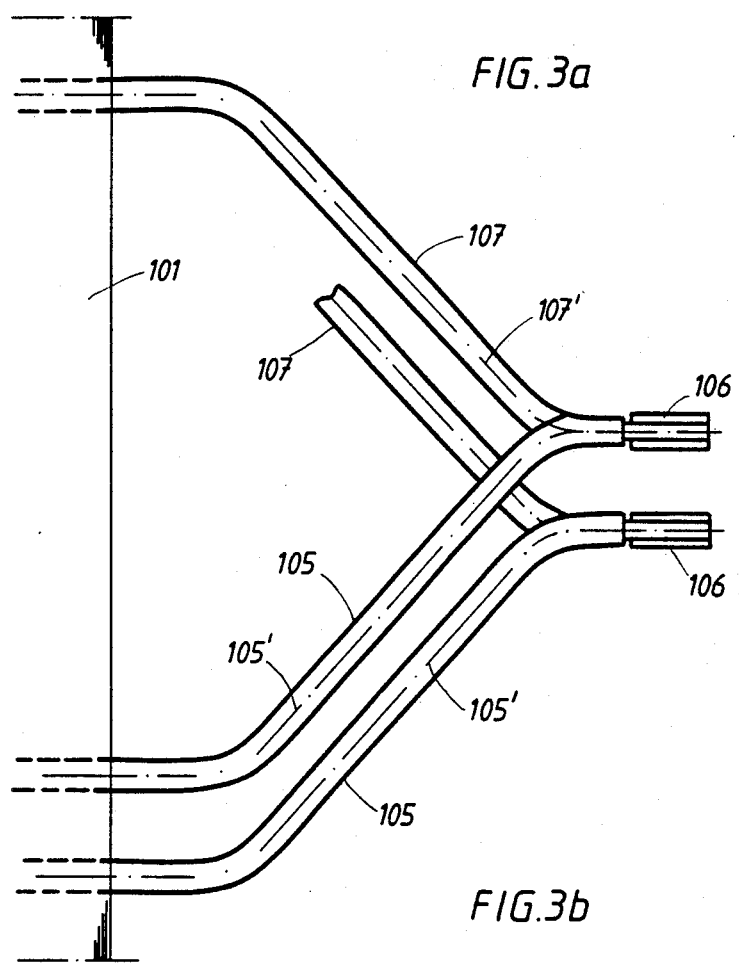
FIG. 3a shows the same detail in radial view.

Each of the coil halves shown in FIG. 3 is made according to FIGS. 4, 5 and 6, which means that the bottom coil half in each coil is congruent with the top coil half of the coil, or equivalently expressed, that the bottom coil half and the top coil half are of identical shape. In each coil the two halves are connected to each other by means of a connecting device 106 which comprises two connecting bars 117, which are brazed between the end points of the coil end halves, the corresponding portions of the coil insulation 118 and the strand insulation being removed. At the end surfaces of each coil half, the strands 116 are connected to each other by means of brazing. The connecting device 106 is surrounded by an insulating cover 115 indicated by dash-dotted lines in FIG. 3.

Each of the two connecting bars 117 is bent in the middle. As an alternative straight bars can be used, while applying a small twisting to the end portions of the two coil end halves included in one and the same coil end in such a way that adjustment to a straight connecting member is obtained. The twisting can lead to the two interconnected coil halves no longer being regarded as being of identical shape. However, if in each coil half we look at a center line passing through the mid-point in all cross-sections, we will see that such a center line in one coil end half will still be congruent with a corresponding center line of the other coil half. In FIG. 3, two such center lines which are congruent with each other—that is, of identical shape—are designated 105' and 107', respectively. Instead of the connecting device shown in FIG. 3, a three-part connecting device can be used, comprising two end portions and a middle portion, each of the two end portions being first connected to a corresponding coil end half and the middle portion being finally arranged to connect the two end portions to each other.

In the coils shown in FIG. 3, the maximum radial dimension is somewhat greater in the straight portions 103 and 104 than in the other coil portions, which is due to the straight portions being made in the form of roebel bars. From FIG. 4 it is clear that the sraight portion of the coil half extends somewhat outside the winding slot 102 in the axial direction. The term "coil end half" means the entire coil half portion which is composed of strands, integrated with the entire straight coil half part and disposed axially outside this coil half part. In each of the coil end halves 107 and 114, suitably a major part, preferably at least 60%, of the radially outwardly-facing surface is located in the plane 109, and each of these coil end halves touches the plane 109 along a major part of the length of the coil end half.

The top coil end half 107 has a radially inwardly-facing surface 111. In FIG. 3 the radial distance between the air gap surface 110 of the stator and some point at the surface 111 is generally designated R, whereas the maximum radial distance between the air gap surface 110 and the radially inwardly-facing surface of the straight portion 104 is designated $R_1$. The distance R is smaller than $R_1$—and even smaller than the average distance between the air gap surface 110 and the straight portion 104—along a major part of the coil end half 107, preferably along at least 70% thereof.

Also in FIG. 3, $\alpha_2 = \alpha_1$. Usually, the angles $\alpha_2$ and $\alpha_1$ are greater than 1.5°, preferably greater than 2° and smaller than 7°.

In FIGS. 3b, 5 and 6, 110' designates an axial extension of the air gap surface 110.

Figure 3B:
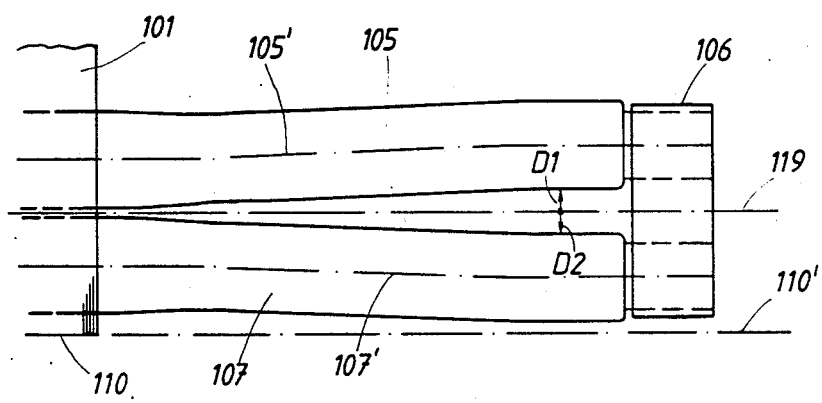
FIG. 3b shows the same detail in horizontal elevation and partly in section, a coil end being shown in the same manner as the coil ends shown in FIG. 1 of the two specifications mentioned above, that is, in so-called "rolling projection". A coil half belonging to the same machine is in FIG. 4 viewed from the center line of the stator and shown in radial view towards a straight coil portion arranged in a winding slot.

In FIGS. 3 and 3b the reference numeral 119 designates the cylindrical surface mentioned above. At every axial distance from the stator core 101, the shortest radial distance D1 from a bottom coil end half to the circular cylindrical surface 119 is equal to the shortest radial distance D2 from a top coil end half to the cylindrical surface 119. Even the corresponding distances to the center lines 105' and 107' are equal.

We claim:

1. A high voltage synchronous machine with a rotor and an annular stator core surrounding said rotor;
    said stator core having a plurality of axially extending and radially inwardly directed winding slots;
    a stator winding disposed in said winding slots;
    said winding consisting of coils, each coil comprising a bottom coil half and a top coil half;
    each of said coil halves having a rectangular cross-section with identical center lines which are congruent and comprising a bundle of transposed strands extending along the entire coil half and being insulated from each other;
    said bottom coil half having a straight bottom portion located at the bottom of a first winding slot, and a bottom end half;
    said top coil half having a straight top portion located near the slot opening of a second winding slot, and a top end half;
    in each coil half the end half is shaped and oriented in relation to its respective straight portion so that at least a part of the top end half lies closer to the machine axis than does said straight top portion, and that the bottom end half lies further from the machine axis than does said straight bottom portion; and a connecting device for connecting the ends of said top end connection half and said bottom end half remote from said straight portions, whereby said straight top and bottom portions are connected to each other at a stator end.

2. A high voltage synchronous machine as claimed in claim 1, in which in each coil half the end half is shaped and oriented in such a way in relation to the straight portion of the coil half that at least 70% of the length of the top end half lies closer to the machine axis than said straight top portion.

3. A high voltage synchronous machine as claimed in claim 1, in which in each coil half the end half is shaped and oriented in such a way in relation to the straight portion of the coil half that the entire top end half lies closer to the machine axis than said straight top portion.

4. A high voltage synchronous machine with a rotor and an annular stator core surrounding said rotor;

said stator core having a plurality of axially extending and radially inwardly directed winding slots;

a stator winding disposed in said winding slots;

said winding consisting of coils, each coil comprising a bottom coil half and an identical top coil half;

each of said coil halves having a rectangular cross-section and comprising a bundle of transposed strands extending along the entire coil half and being insulated from each other;

said top coil half having a straight top portion located near the slot opening of a second winding slot, and a top end half, at least a portion of which is closer to said machine axis than said straight top portion, said top end half having a major portion of its radially outwardly facing surface at the inner side of a first plane tangent to the radially outwardly facing surface of the straight top portion and perpendicular to an axial plane through the mid-point of said straight top portion, and said top end half having a major portion of its radially outwardly facing surface located in a second plane which intersects said first plane along a substantially axially extending intersectional line at a first angle $\alpha_1$;

said bottom coil half having a straight bottom portion located at the bottom of a first winding slot, and a bottom end half which lies further from the machine axis than said straight bottom portion, the bottom end half having a major portion of its radially inwardly facing surface located radially outwardly of a third plane, which is tangent to the radially inwardly facing surface of the straight bottom portion and perpendicular to an axial plane through the mid-point of said straight bottom portion, the bottom end half having a major portion of its radially inwardly facing surface extending in a fourth plane which intersects said first plane along as substantially axially extending intersectional line at a second angle $\alpha_2$ and that said angles are substantially equal and between 1.5° and 7°; and an end connection connecting said straight top and bottom portions to each other at a stator end comprising said top end half, said bottom end half and a connecting device connecting the ends of said end halves remote from said straight portions.

* * * * *